June 3, 1924.
J. C. H. GRANT
COFFEE PULPING MACHINE
Filed July 24, 1923
1,496,265
2 Sheets-Sheet 1
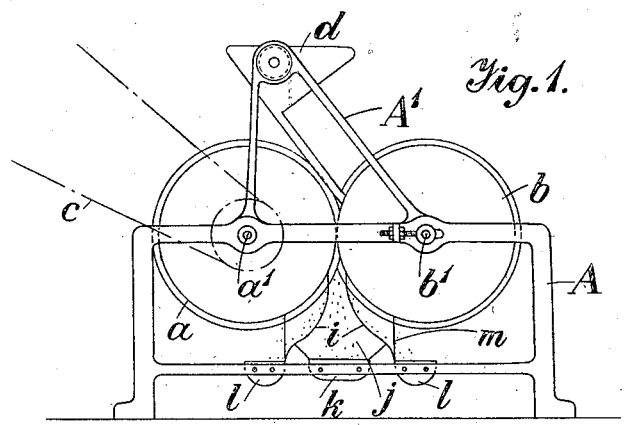
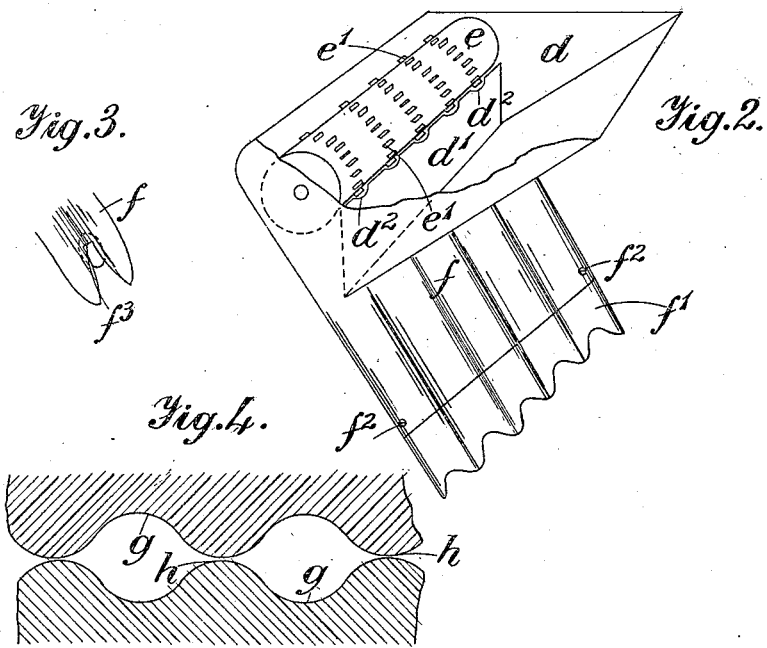
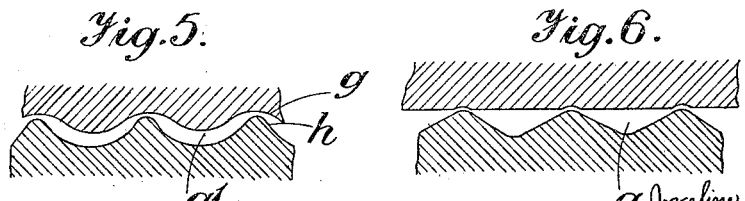
Inventor:—
Josceline C. H. Grant,
By Fowler and Smith,
Attorneys.

Patented June 3, 1924.

1,496,265

UNITED STATES PATENT OFFICE.

JOSCELINE CHARLES HENRY GRANT, OF KITIMURU, CHANIA BRIDGE, EAST AFRICA.

COFFEE-PULPING MACHINE.

Application filed July 24, 1923. Serial No. 653,578.

*To all whom it may concern:*

Be it known that I, JOSCELINE CHARLES HENRY GRANT, a subject of the King of Great Britain, residing at Kitimuru, Chania Bridge, Kenya Colony, East Africa, have invented certain new and useful Improvements in Coffee-Pulping Machines, of which the following is a specification.

This invention relates to the pulping of coffee and the like and consists of improved mechanical means for separating the beans from the cherry or pulp portion.

According to the present invention, the coffee or the like is pulped by squeezing it between rollers, one or both rollers being grooved so that the beans fall into the grooves, while the pulp or cherry adheres to the raised or contact surfaces of the rollers.

Suitable scraping devices are arranged to remove the pulp from the rollers, and if necessary to dislodge the beans from the grooves, the separated products then falling into troughs or the like by which they are led away.

The rollers are preferably so shaped that one roller has comparatively shallow grooves around its surface while the other has a corresponding number of circumferential ribs of sharply inclined V-section separated by deeper grooves.

A hopper device is also arranged to feed the coffee cherries to the rollers, by means of chutes leading to the points of engagement.

The invention is hereafter described with reference to the accompanying drawings, in which:—

Figure 1 is an end elevation of a suitable form of construction of the improved pulping machine.

Figure 2 is a perspective view of the feed-device, with one end of the hopper removed.

Figure 3 is a detail of the lower end of the feed-chute.

Figures 4, 5 and 6 illustrate suitable sections for the rollers of the pulping machine.

Figure 7:
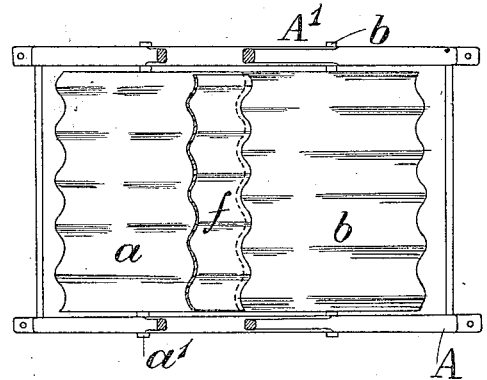
Fig. 7 is a top plan of Fig. 1 with the hopper cut away.
Figure 8:
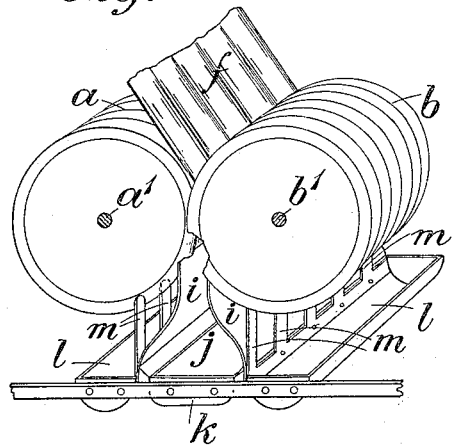
Fig. 8 is a perspective view showing the structure of the scrapers and their relation to the rollers.

In the construction illustrated in Figure 1, the machine comprises a suitable frame A, upon which are journaled two rollers $a\ b$, mounted upon parallel shafts $a'\ b'$; the rollers $a\ b$ revolve in opposite directions, one being driven for example by belting $c$ or other suitable means, and the other roller revolving by frictional contact with the same. The driven roller $a$ is preferably mounted on fixed centres, while the other $b$ can be adjusted towards or away from the first.

An extension $A'$ of the frame supports a hopper $d$ of convenient size according to the quantity of material with which the machine is to deal.

The coffee cherries are led, preferably with a stream of water, into the hopper $d$ arranged above the rollers $a\ b$, and containing a notched wall or partition $d'$ behind which there is fitted a feed roller $e$ driven by a belt or chain for example from one of the rollers $a\ b$. This feed roller $e$ has series of teeth or knurled rings $e'$ at intervals in its length, each set of teeth or each ring corresponding to one of the notches $d^2$ in the partition $d'$ so that the rotation of the feed roller flicks the cherries over the partition, down a series of inclined chutes, so arranged that the cherries arrive singly in separate paths of descent between the upper engaging surfaces of the rollers $a\ b$.

I have shown the hopper as being provided with a corrugated plate $f$ which forms a chute device, each channel in the upper surface of the inclined plate acting as a guide for the descending cherries in the direction towards the rollers $a\ b$.

The plate $f$, see Fig. 2, has its lower end cut to fit the contour of the main roller $b$, and the end section $f'$ is adjustable for example by means of slides $f^2$ to provide for variation of the size of the coffee beans. Preferably as shown more clearly in Figure 3, the bottoms of the grooves in the plate $f$, are notched as at $f^3$ to allow the rollers to grip the cherries vertically.

The contacting rollers are provided with grooves or corrugations $g$ which may be of various shapes as represented for example in Figures 4 to 6, where a small gap is left between the parts for the sake of clearness, although the rollers actually rotate in contact, the principle being that the cherry is led by the feed-device to a portion of the rollers where it is held and squeezed between the raised or contact portions $h$ of such rollers. By this action the coffee beans, which are coated with slimy matter, are squeezed from the pulp and pushed sideways by the angled or oblique faces of the rollers into the grooves $g$. On the other hand, the coffee pulp or cherry is held fast between those parts of the rollers which are closest together and is subsequently removed by suitably shaped scrapers $i$ arranged to engage the surfaces of the rollers as they commence moving away from each other. These scrapers lead the pulp into the interior of the chamber $j$, whence it falls into the channel $k$ and is led away with water. The coffee beans, being in the grooves $g$ are not caught by the scrapers, and are free to fall on to the outside of the chamber $j$, and thence into the channels $l\ l$, whence they are led away with water. Additional finger-shaped scrapers $m$ may be fitted to the outside of the chamber $j$ or at other suitable points, to project into the grooves of the rollers and remove any beans that may adhere to them, the beans then falling between the fingers $m$ into the chamber $l\ l$.

The raised portions $h$ of the rollers $a\ b$ (i. e. those portions in which no grooves have been cut), may be machined at any suitable angle to the sides of the rollers, so that the pulped beans may more readily slide into the grooves prepared for them.

For example, as illustrated in Figure 5, the general shape of the rollers, instead of being cylindrical, may comprise alternate oppositely-directed frustro-conical zones, the raised portions or ridges $h$ of one roller fitting closely into the shallow depressions $g$ of the other roller and vice versa; at or on one side of the bottom of each depression a circumferential groove $g'$ of approximately semi-circular section may be provided to receive the separated beans.

Alternately, as shown in Figure 6, one roller may be of plain cylindrical shape, and the other roller formed with circumferential grooves $g$ spaced at suitable intervals along its length. The coffee is led to the contacting surfaces between the grooves, the pulp adhering to these surfaces and the berries sliding laterally into the grooves $g$ from which they fall or are removed when the rollers are clear of one another.

It will be understood that the invention is not limited to the details given by way of example, and that the grooving of either or both the rollers, their directions of rotation, and the method of feeding the coffee to the rollers may be modified if desired.

Having thus described my invention, what I claim is:—

1. A coffee pulping machine, comprising a pair of contacting rollers, means for revolving said rollers, one of said rollers having its peripheral surface formed with circumferential grooves, means for feeding coffee cherries between said rollers, said grooves adapted to receive the beans separated by the squeezing action of said rollers, scrapers for removing the pulp from the contacting surfaces of said rollers, and means for removing the beans from said grooves after passing said scrapers.

2. A coffee pulping machine, comprising a frame, parallel shafts journaled in said frame, rollers mounted on said shafts, means for driving said shafts, one of said rollers formed with spaced circumferential grooves, means for regulating the separation of said shafts, a hopper for feeding coffee cherries between said rollers, and means for removing the pulp from said rollers, said pulp removing means adapted to allow the passage of the beans contained in said grooves.

3. A coffee pulping machine, comprising a pair of contacting rollers, means for revolving said rollers, a hopper for receiving the coffee cherries, a feed chute, means for delivering cherries from said hopper upon said feed chute, said chute having guides between said rollers and towards their line of contact, said cherries being separated into beans and pulp while passing between said rollers, and means for removing the pulp and the beans separately.

4. A coffee pulping machine, comprising a pair of contacting rollers, said rollers having grooved peripheries, means for revolving said rollers, a feed device mounted above said rollers and delivering coffee cherries towards the line of contact of said rollers, a chute down which said cherries travel, said chute consisting of a corrugated plate having its lower end shaped to fit the contours of said rollers, and means for adjusting the end of said plate in relation to said rollers.

5. A coffee pulping machine, comprising a pair of contacting rollers, said rollers having grooved peripheries, means for revolving said rollers, a feed device mounted above said rollers, a chute delivering coffee cherries from said feed device towards the line of contact of said rollers, said chute consisting of a corrugated plate having its lower end shaped to fit the contours of said rollers and provided with notches at intervals along its lower edge, means for adjusting the end of said plate in relation to said rollers, and means for removing the pulp and the berries separately after the cherries have been squeezed by said rollers.

In testimony whereof I hereunto affix my signature.

JOSCELINE CHARLES HENRY GRANT.